March 10, 1931. C. I. JONES 1,795,399
DUMP VEHICLE
Filed May 20, 1929  3 Sheets-Sheet 1
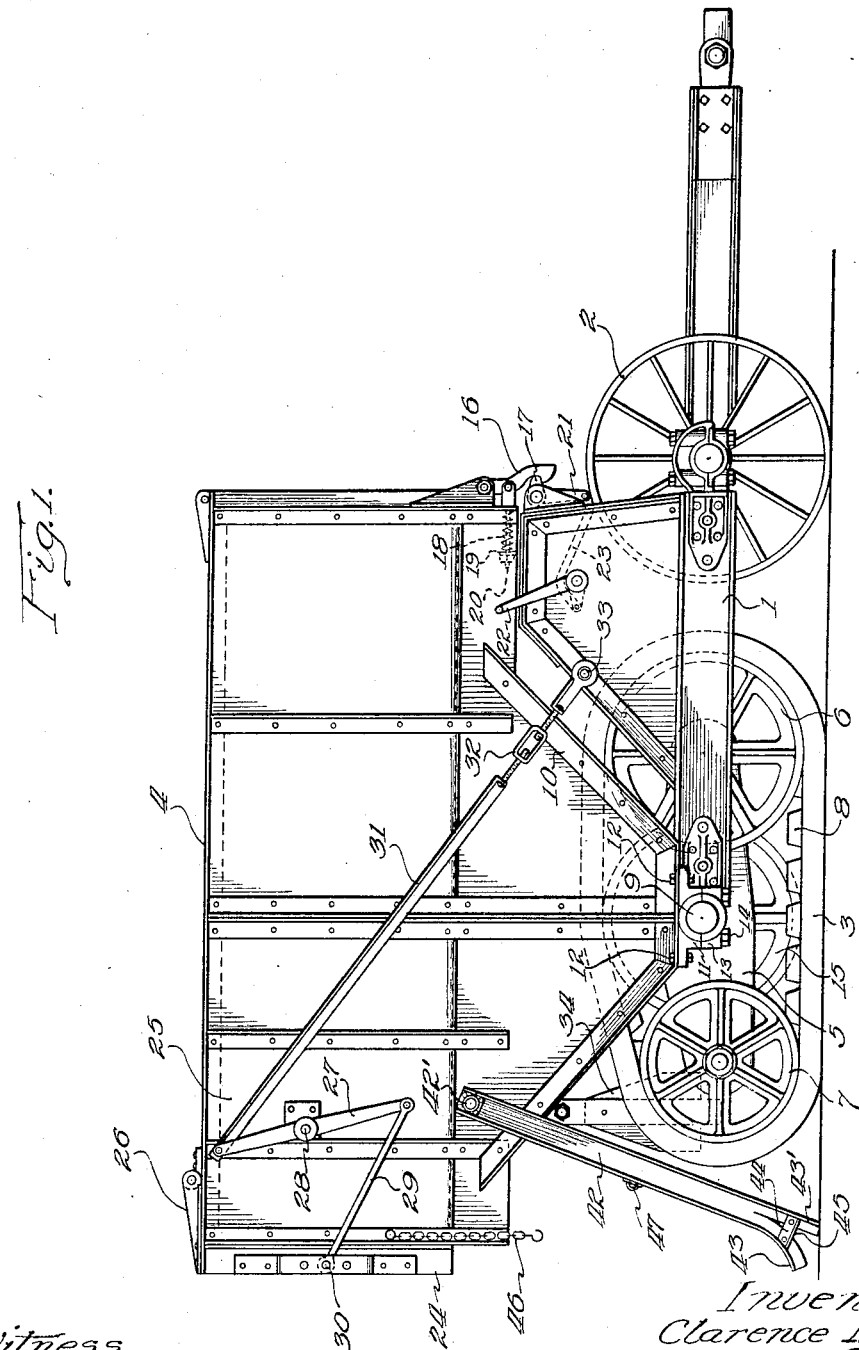
Witness
Arthur M. Framke.
Inventor.
Clarence I. Jones.
By Rummler & Rummler
Attys:

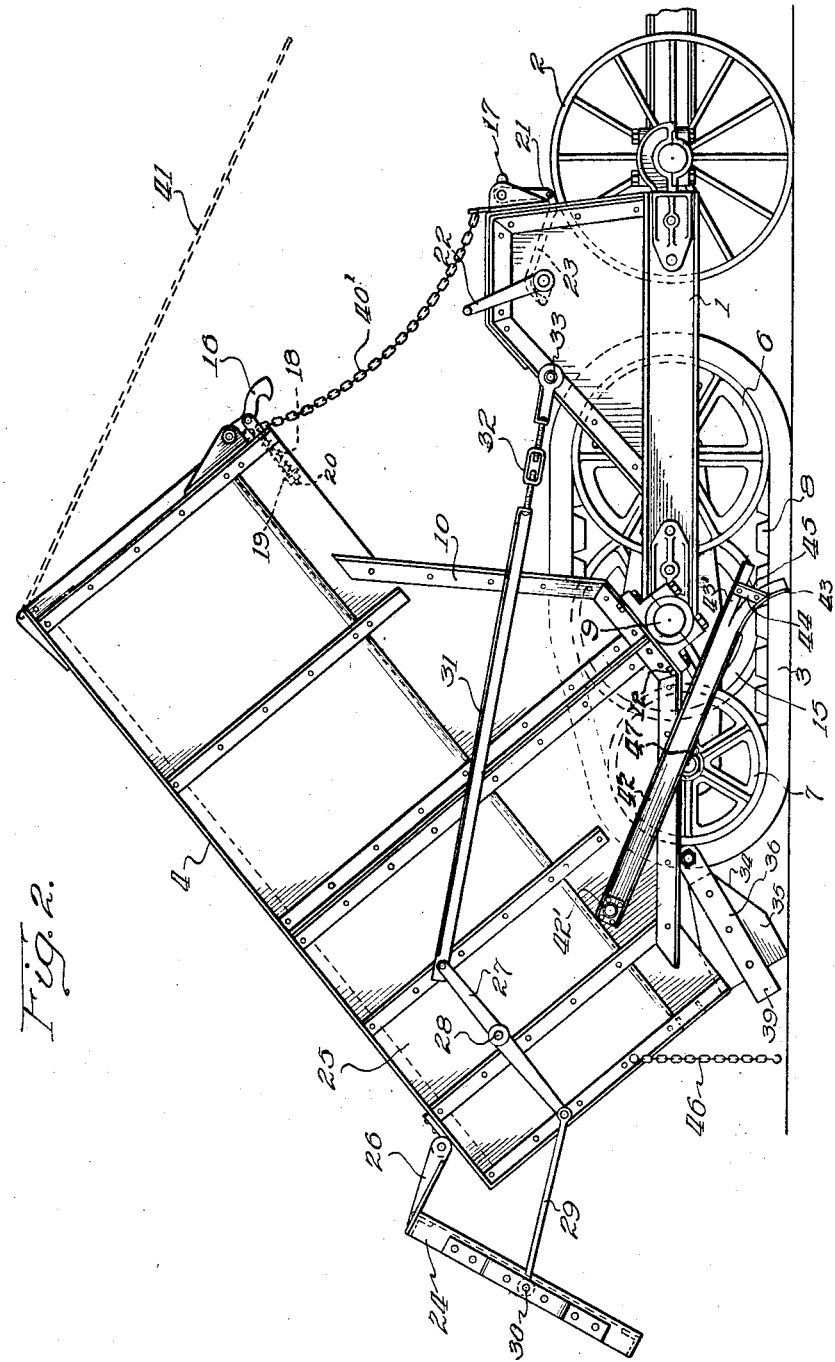

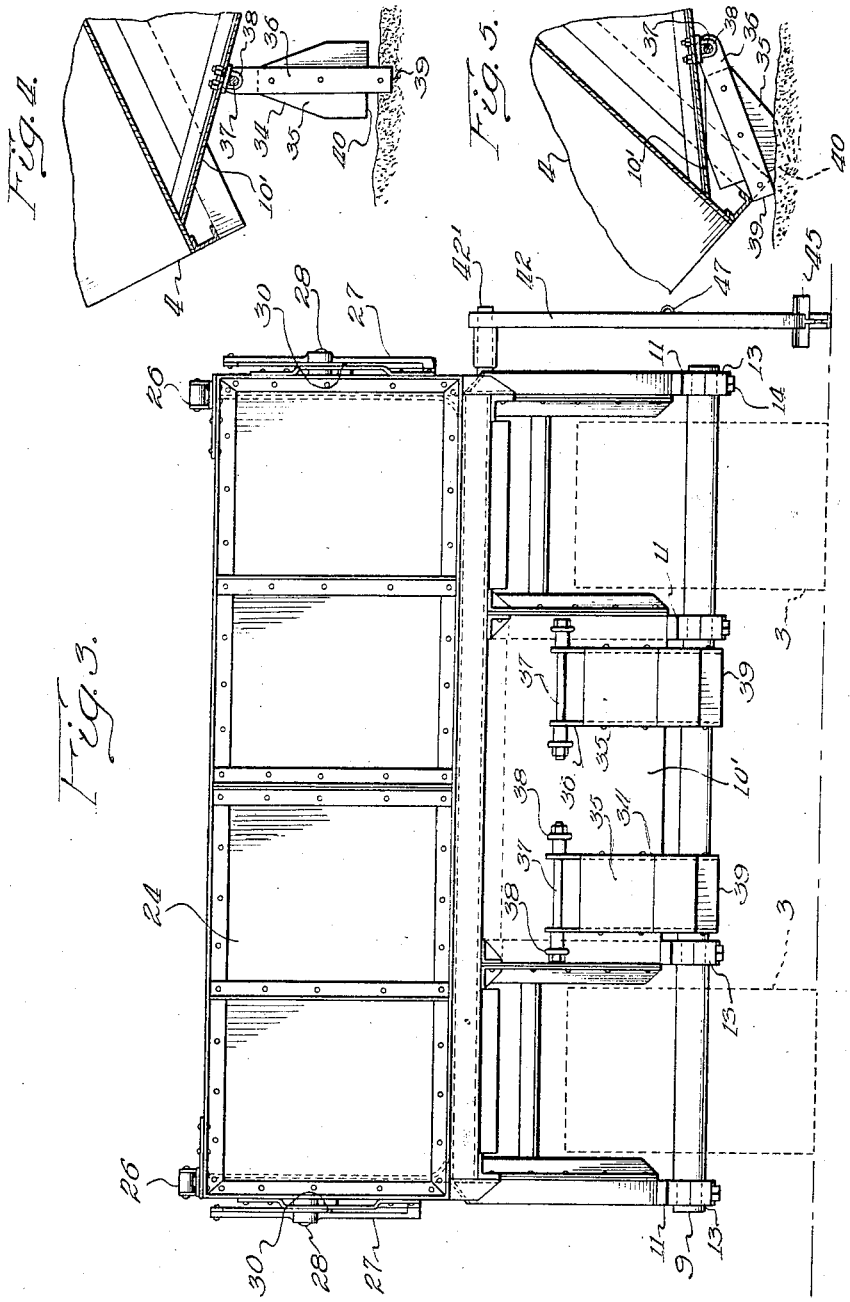

Patented Mar. 10, 1931

1,795,399

UNITED STATES PATENT OFFICE

CLARENCE I. JONES, OF ST. LOUIS, MISSOURI

DUMP VEHICLE

Application filed May 20, 1929. Serial No. 364,606.

This invention relates to improved dump trailers and trucks particularly of the crawler type.

Dump vehicles which accommodate large quantities of material have required the employment of hoisting mechanism in unloading operations and difficulty has been encountered in evenly spreading their contents to produce a uniform fill. In devices of this class, the dumping bodies have been constructed to discharge their contents at one side of the vehicle, at the end of the vehicle between its wheels or through the bottom along the entire length of the body. When this construction is used on a vehicle having crawler trucks, successive loads cannot be laid adjacent each other. The resulting fill consists of laterally spaced windrows of material having furrows therebetween substantially as wide as the trucks. These furrows have to be filled in by hand shovels or team drawn grading machines.

The rear end of a dumping body of the type which discharges material rearwardly between the rear wheels is usually pivotally mounted on the chassis of a vehicle above the wheels thereof and when the body is in dumping position, the contents thereof are discharged in heaps. Generally, forward movement of a vehicle is relied upon to spread the material but this is unsuccessful with slow moving vehicle, such as tractor trailers, because the distance between the ground and the discharge end of the body is too great to allow the material emptied to hold back the remainder of the material in the body while the vehicle slowly proceeds forward. The heaps of material formed by such dumping operations frequently have to be spread by hand shovels or team drawn scrapers and graders.

The main objects of this invention are to provide an improved dumping vehicle which will discharge the material over the rear crawler trucks of the vehicle upon which it is mounted so as to deposit material in the path of the trucks in back of the vehicle as well as between such paths, thereby producing a substantially uniform fill; to provide an improved mounting of a dumping body on a vehicle for causing the discharge end thereof to be positioned close to the ground during dumping operations so that the material being emptied from the body will hold back the remaining contents thereof and cause the contents of the body to be laid evenly upon the ground as the vehicle is moved forwardly; to provide an improved mounting for a dump trailer body which will permit the body to be rotated to an unloading position without the aid of hoisting equipment; to provide an improved construction and arrangement in which the point of pivotal attachment of a dump body is of sufficient distance from the center of mass thereof to create a moment, when the vehicle is suddenly started, which will rock the body to a dumping position; to provide improved tilting arresters for interrupting the rotation of the body when the latter is being dumped so as to protect the discharge end of the body from forceful engagement with the ground and permit light structure to be employed in its construction; and to provide improved means for holding a tail gate in predetermined open position for spreading and leveling off the dumped material as the vehicle is moved forwardly.

Further objects of this invention are to provide an improved prop for restoring a vehicle dump body to a loading position by the initial movement of the vehicle after the contents thereof have been dumped; to provide an improved tail gate mounting structure for allowing the tail gate to be moved bodily from the vicinity of the discharge end of the body so as to permit unobstructed discharge of the material which is usually piled above the sides of the body; to provide an improved actuating mechanism for automatically opening and closing the tail gate of a dump body as the latter is rotated to unloading and loading positions respectively; and to provide improved means for releasably retaining the dump body in a loading position.

In the accompanying drawings I have shown a specific embodiment of my invention, in which:

Figure 1 is a side elevation of a trailer showing the body in a loading and carrying position.

Fig. 2 is a side elevation similar to Fig. 1 showing the body of the trailer in an intermediate dumping position.

Fig. 3 is a rear end elevation of the trailer body.

Fig. 4 is a fragmentary vertical section of the rear end portion of the body taken at the longitudinal center thereof and showing the body in an arrested position.

Fig. 5 is a fragmentary section similar to Fig. 4 showing the body in extreme dumping position.

In the form shown, the trailer comprises a chassis frame and spaced rear crawler trucks. The trucks are connected with the chassis frame by a transverse shaft journaled in apertures in the sides of said frame and apertures in the frame of the trucks. A dump body having an open discharge end is mounted above the chassis frame by side and intermediate structure having clamping members thereon by which the body is rigidly secured to the laterally extending shaft. Coacting latch mechanism is provided on the chassis and body respectively for preventing the body and shaft from rotating relative to the chassis when the body is in a loading and carrying position.

A tail gate pivotally mounted on the discharge end of the body is provided with actuating mechanism by which it is automatically opened and closed as the body rocks to unloading and loading positions respectively.

Tilting arresters or shock absorbers for interrupting the initial downward rotation of the discharge end of the body and thereafter allowing the body to tilt gradually as the vehicle is moved forwardly, are pivotally mounted on the intermediate supporting structure of the body. A prop pivotally mounted on the side of the body and engageable with the ground therebelow is provided for righting the body to a loading position as the vehicle is moved forwardly after its contents have been emptied.

In the construction illustrated, a vehicle comprising a chassis 1, front wheels 2, and rear crawler trucks 3 is provided with a dump body 4. The trucks 3 comprise an intermediate frame 5, pairs of front and rear wheels 6 and 7 respectively, and an endless chain of tread members 8. An axle or shaft 9 is journaled in apertures in the frames 5 of each truck. This axle extends through apertures in the sides of the chassis thereby connecting the tractor trucks and the chassis. The axle extends outwardly at both ends beyond the sides of the chassis 1, providing a mounting for the dump body 4. The dump body 4 comprises downwardly extending side structures 10 and an intermediate structure 10' on which upper clamping members 11 are adjustably mounted by bolts 12. The clamping members 11 and complementary clamping members 13 together form a collar for receiving the shaft or axle 9. These members are firmly clamped together by bolts 14 thereby conveniently securing the dump body 4 on the axle 9. The dump body may be adjusted in position by removing the bolts 12 and moving the body forwardly or rearwardly relative to the upper clamping member 11.

The axle 9 thus serves as a connection between the chassis of the vehicle and the tractor trucks, provides a pivotal mounting for the vehicle body, and in addition it supports the idler wheels 15 of the caterpillar trucks.

Latch mechanism comprising a hook 16 pivotally mounted on the front end of the body 4 and a catch 17 pivotally mounted on the front end of the chassis 1 is provided for releasably holding the body 4 in its upright horizontal position. The hook 16 is resiliently urged towards the catch 17 by a spring 18 which bears between a collar 19 on a rod 20 connected with the hook, and the inner side of the front wall of the vehicle. The catch or pin 17 is carried by one arm of a bell crank lever 21 which is operatively connected with a hand lever 22 by the link 23. When the hand lever 22 is rotated in a clockwise direction, the catch 17 is in turn rotated out of registration with the hook 16, and the body becomes free to rotate rearwardly.

A tail gate 24 for closing the discharge end of the body 4, is pivotally attached to the upper edge of sides 25 of the body, by arms 26. The arms 26 extend forwardly from the rear end of the body and provide a pivotal attachment for the tail gate 24 by means of which the latter may be moved bodily from the vicinity of the discharge end of the body. This feature is accomplished without the employment of overhead structure which would be in the way of a shovel or other loading equipment by pivotally attaching the arms 26 to the body in advance of the rear end thereof.

The tail gate 24 is automatically opened and closed as the body is rotated to unloading and loading positions respectively by mechanism shown in Figures 1 and 2. The gate opening apparatus comprises a lever 27 pivotally mounted intermediate its ends on a pin 28 secured to the side of the body 4. The lower end of the lever 27 is connected with the tail gate by a rigid link 29. The link 29 is pivotally attached to the tail gate 24 by a safety pin 30, preferably comprising soft metal, which will shear before the gate opening mechanism would be subjected to a force sufficient to injure it. The upper end of the lever 27 is connected with the chassis 1 of the vehicle by an adjustable link 31 preferably comprising an angle bar. The link 31 includes a turnbuckle 32 by means of which it may be lengthened and shortened. The lower end of the link 31 is pivotally mounted on a pipe 33 which extends laterally across the width of the vehicle and protrudes from the sides thereof. A cotter pin, nut or other suitable means, may be employed on the outer extremities of the pipe 33 for retaining the lower ends of the links 31 on the extremities of the pipe. Both the right and left hand sides of the body are provided with tail gate actuating mechanism identical to that shown in Figure 1.

Tilting arresters or shock absorbers 34 are provided for interrupting the initial downward rotation of the discharge end of the body when the latter is tilted to a dumping position. These arresters each comprises a wooden block 35 having metal strips 36 of strap iron inlaid in its opposite sides. The strips 36 extend above the top of the block 35 and are provided with apertures for receiving a bolt 37 which is mounted on the intermediate supporting structure 10' of the body 4. The bolts 37 extend through eyes 38 rigidly attached to the intermediate supporting structure. The block 35 of the tilting arrester is recessed at its bottom extremity for providing a protruding portion 39 of reduced dimensions and the front and rear sides of the block are beveled at their upper end portions as illustrated in Figs. 4 and 5. The arresters normally hang downwardly in the position shown in Fig. 3 when the body is upright, but when the body is in the unloading position shown in Fig. 5 they lie adjacent the intermediate supporting structure 10'. A chain 40' attached at one end to the front side of the body and at its other end to the chassis limits the rearward rotation of the body when the arresters cannot be relied upon while dumping over a cliff.

A cable 41 is secured to the body for returning it to an upright position. The cable may be tensioned by attaching its free end to the caterpillar of the tractor by which the trailer is drawn or it may be secured to the body in close proximity to its own caterpillars and secured thereto at its free end. A prop 42 pivotally mounted on a trunnion 42' extending from the side of the body is also provided for this purpose. The prop preferably comprises an I-beam which is split longitudinally at its lower end.

One side of the split portion of the I-beam is bent arcuately as shown in Fig. 1 providing a curved prong 43 and a straight prong 43'. The prongs are reinforced by cleats 44 comprising angle plates each having a web 45. One cleat is mounted on each side of the prop. The webs of the cleats are of sufficient width to provide a bearing surface having a substantial area. When the body is in upright position and the prop is not in use, it may be carried in an elevated position not shown in the drawings, by attaching the chain 46 to the hook 47 on the prop.

The operation is as follows:

The body is filled while it is in upright position and when it is desired to dump its contents the hook 16 is released by the manipulation of the hand lever 22 and the entire vehicle is suddenly started or jerked in a forward direction. This action causes the body which is pivotally mounted substantially over its center of mass to be tilted in an anti-clockwise direction. There is sufficient distance between the center of mass and the point of pivotal attachment to create a moment, when the vehicle is suddenly started, of ample degree to tilt the body even when the forward portion thereof is loaded in excess of the rear portion to a substantial extent.

As the body begins to rotate to its dumping position, the tilting arresters 34 swing downwardly and approach the ground. Further rotation of the body 4 causes the protruding portion 39 to be extended into the ground thereby gradually slowing up the rotation of the body. This action is particularly advantageous when the vehicle is used on rocky or frozen ground. When the entire length of the protruding portion 39 has been sunk into the ground, the shoulders 40 on the arrester contact with the earth and prevent further rotation of the body. By moving the vehicle forwardly the tilting arresters 34 may be rocked to the position shown in Fig. 5 thus causing the final steps of the dumping operation to be gradually effected. As the body 4 is rotated to its dumping position shown in Fig. 2, the lever 27 is rotated clockwise and the tail gate 24 is moved to the open position shown in Fig. 2. The rigid link 29 retains the tail gate 24 in open position until the body is righted. As the vehicle is moved forwardly with the tail gate in open position the bottom edge of the latter scrapes the top of the dumped material and levels it off. The tail gate may be retained in various different open positions as required by the nature of the material being carted, by altering the pivotal attachment of the rear end of lever 29 and adjusting the turn buckle 32.

When the body is in its extreme dumping position, its discharge end is in close proximity to the ground and the contents of the body which first fall to the ground hold back the material remaining in the body and prevent it from being discharged in a heap. It is therefore necessary for the vehicle to be moved gradually in a forward direction in order to discharge all the material from the body. In this manner a layer of substantially uniform thickness is laid upon the ground behind the vehicle as it is moved forwardly.

The body 4 may be righted from its dumping position by manually placing the prop 42 in the forwardly inclined position shown in Fig. 2 and then moving the trailer forwardly. The prongs sink into the ground until the webs of the cleats engage the ground surface and thereafter, forward movement of the vehicle exerts an upward thrust on the rear end of the body.

The contents of the body may be dumped over a cliff or from one elevation to a lower elevation by backing the trailer after it has been properly placed relative to the top of the cliff and rotated to the position shown in Fig. 4. The tilting arresters 34 are rotated to a rearwardly inclined position by the backward movement and rotation of the body is limited by the chain 40'.

When the ground beneath the trailer does not permit the use of the righting prop, the body may be conveniently rotated to an upright position by securing the free end of the cable 41 to a caterpillar of the tractor by which the trailer is drawn. The caterpillar moves relative to the tractor as the latter is driven forwardly and the cable pulls the body back to its initial position. The movement of the caterpillars of the trailer relative to its body may also be relied upon for righting the body.

As the body is tilted to upright position, the lever 27 is rotated in an anti-clockwise direction, thereby moving the tail gate to the position shown in Fig. 1 where it is firmly held against the rear open end of the body by the rigid link 29.

As shown in Fig. 3, the discharge end of the body extends the complete width of the vehicle and is adapted to discharge material behind the vehicle in the path of the caterpillar trucks as well as between them. With a dump vehicle of the type described, a substantially uniform fill may be produced by laying one load of material absolutely adjacent the preceding loads and without leaving furrows between successive loads.

Although but one specific embodiment of this invention has been herein shown and described, it will be understood that numerous details of the construction shown may be altered or omitted without departing from the spirit of this invention as defined by the following claims.

I claim:

1. A vehicle of the class described comprising a chassis, a dump body pivotally mounted substantially midway between its front and rear extremities on said chassis adapted to tilt to an unloading position, a tilting arrester comprising a block pivotally mounted on said body for co-action with the surface over which the vehicle is drawn for interrupting the initial tilting of said body and for effecting a later gradual tilting thereof as said vehicle is moved forwardly, and means comprising a chain attached at its ends to said body and chassis respectively for positively limiting the tilting of said body when material is dumped from one elevation to a lower elevation.

2. A dump vehicle of the class described comprising a supporting structure including an axle carrying beams having supporting wheels journaled on the ends of the beams, a load carrying body pivotally mounted upon said axle and extending laterally over said wheels and otherwise arranged so that when uniformly filled the center of gravity of the body will be substantially over said axle and above said wheels in order that said body may easily rock rearwardly to an unloading position, and means carried by said body for coaction with the surface over which the vehicle is drawn arranged to control the rearward rocking of the body gradually as the vehicle is drawn forward.

3. A dump vehicle of the class described comprising a supporting structure including the load carrying wheels, a body pivotally mounted on said supporting structure so that its center of gravity is substantially above its pivotal supports whereby the body may rock rearwardly to an unloading position when the vehicle is suddenly started, said body extending laterally over said supporting wheels, and means carried by said body for coacting with the surface over which the vehicle is drawn to control the rearward rocking of said body and thereby cause the load to be gradually released as the vehicle is drawn forward.

Signed at Chicago this 7th day of May, 1929.

CLARENCE I. JONES.